US012574372B2

(12) United States Patent
Ricchuiti et al.

(10) Patent No.: US 12,574,372 B2
(45) Date of Patent: Mar. 10, 2026

(54) SHARING A BIOMETRIC TOKEN ACROSS PLATFORMS AND DEVICES FOR AUTHENTICATION

(71) Applicant: Capital One Services, LLC, McLean, VA (US)

(72) Inventors: Andrew Ricchuiti, Dallas, TX (US); James Dunlap, The Colony, TX (US); Mayur Gupta, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 303 days.

(21) Appl. No.: 17/934,269

(22) Filed: Sep. 22, 2022

(65) Prior Publication Data

US 2024/0106823 A1 Mar. 28, 2024

(51) Int. Cl.
*H04L 9/40* (2022.01)

(52) U.S. Cl.
CPC ...... *H04L 63/0861* (2013.01); *H04L 63/0815* (2013.01); *H04L 63/102* (2013.01)

(58) Field of Classification Search
CPC . H04L 63/0861; H04L 63/0815; H04L 63/10; H04L 63/102
See application file for complete search history.

(56) References Cited

U.S. PATENT DOCUMENTS

| | | | | | |
|---|---|---|---|---|---|
| 10,454,924 | B1 * | 10/2019 | Jain | ..................... | H04L 63/0838 |
| 2010/0185871 | A1 * | 7/2010 | Scherrer | ............. | G06F 21/6218 |
| | | | | | 726/4 |

| | | | | | |
|---|---|---|---|---|---|
| 2013/0263211 | A1 * | 10/2013 | Neuman | ............. | H04L 63/0823 |
| | | | | | 726/1 |
| 2019/0222570 | A1 * | 7/2019 | Krishan | .................. | G06F 21/45 |
| 2019/0243956 | A1 * | 8/2019 | Sheets | ................. | H04L 63/0861 |
| 2020/0068399 | A1 * | 2/2020 | Brown | ................ | H04L 63/0861 |
| 2020/0213114 | A1 * | 7/2020 | Sarin | ........................ | G06F 21/41 |
| 2020/0403986 | A1 * | 12/2020 | Gosalia | ............... | H04L 63/0815 |
| 2022/0303268 | A1 * | 9/2022 | Karnaros | ............ | H04L 63/0861 |
| 2022/0321556 | A1 * | 10/2022 | Gandhi | ............... | H04L 63/0861 |

FOREIGN PATENT DOCUMENTS

| | | | | | |
|---|---|---|---|---|---|
| CA | 2451491 | C | * | 6/2009 | ............. G06F 21/32 |
| EP | 2953079 | A1 | * | 12/2015 | ............. G06F 21/00 |

* cited by examiner

*Primary Examiner* — Patrice L Winder
(74) *Attorney, Agent, or Firm* — Harrity & Harrity, LLP

(57) ABSTRACT

In some implementations, a device may obtain the biometric token associated with an account via a registration procedure associated with a first platform that is associated with a host. The server device may store an indication of the biometric token in a database. The server device may receive a login request associated with the account for a second platform that is associated with the host. The server device may identify that biometric authentication is enabled for the account based on the indication of the biometric token being stored in the database. The server device may provide an authentication challenge associated with the biometric token. The server device may receive a response to the authentication challenge indicating whether the authentication device has authenticated biometric information associated with a user based on the biometric token. The server device may authenticate the login request for the second platform based on the response.

20 Claims, 6 Drawing Sheets

300

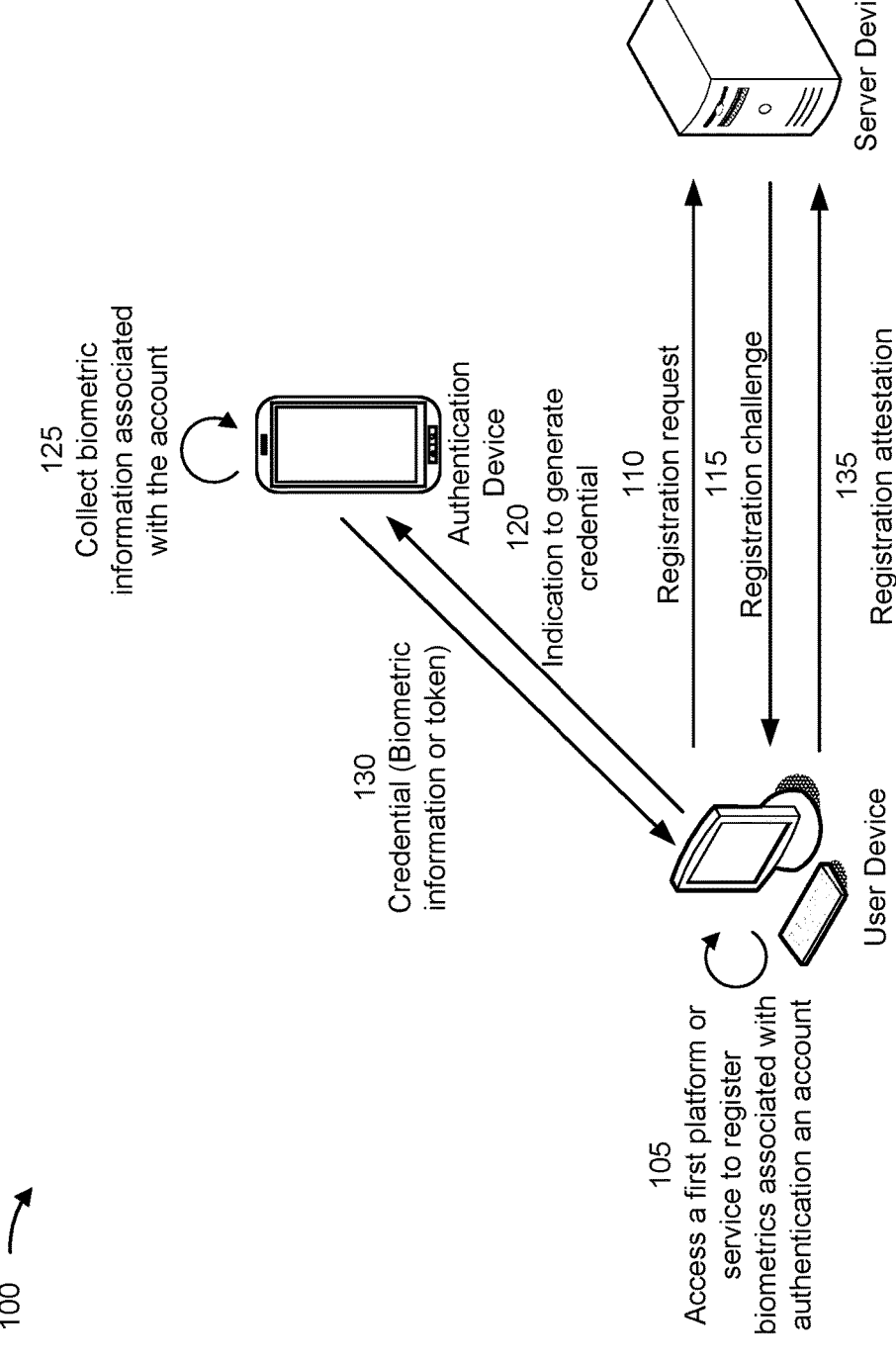

100

125
Collect biometric
information associated
with the account

120
Authentication
Device

130
Credential (Biometric
information or token)

Indication to generate
credential

110
Registration request

115
Registration challenge

135
Registration attestation

Server Device

User Device

105
Access a first platform or
service to register
biometrics associated with
authentication an account

FIG. 1A

Centralized database for a host

| Account ID | Device ID | Token |
|---|---|---|
| 0123 | 1ABC | Token 1 |
| 4587 | 24FY | Token 2 |
| 9627 | LI64 | Token 3 |
| 2574 | OM92 | Token 4 |

140
Store the biometric token
in a centralized database

Server Device

100

200

400

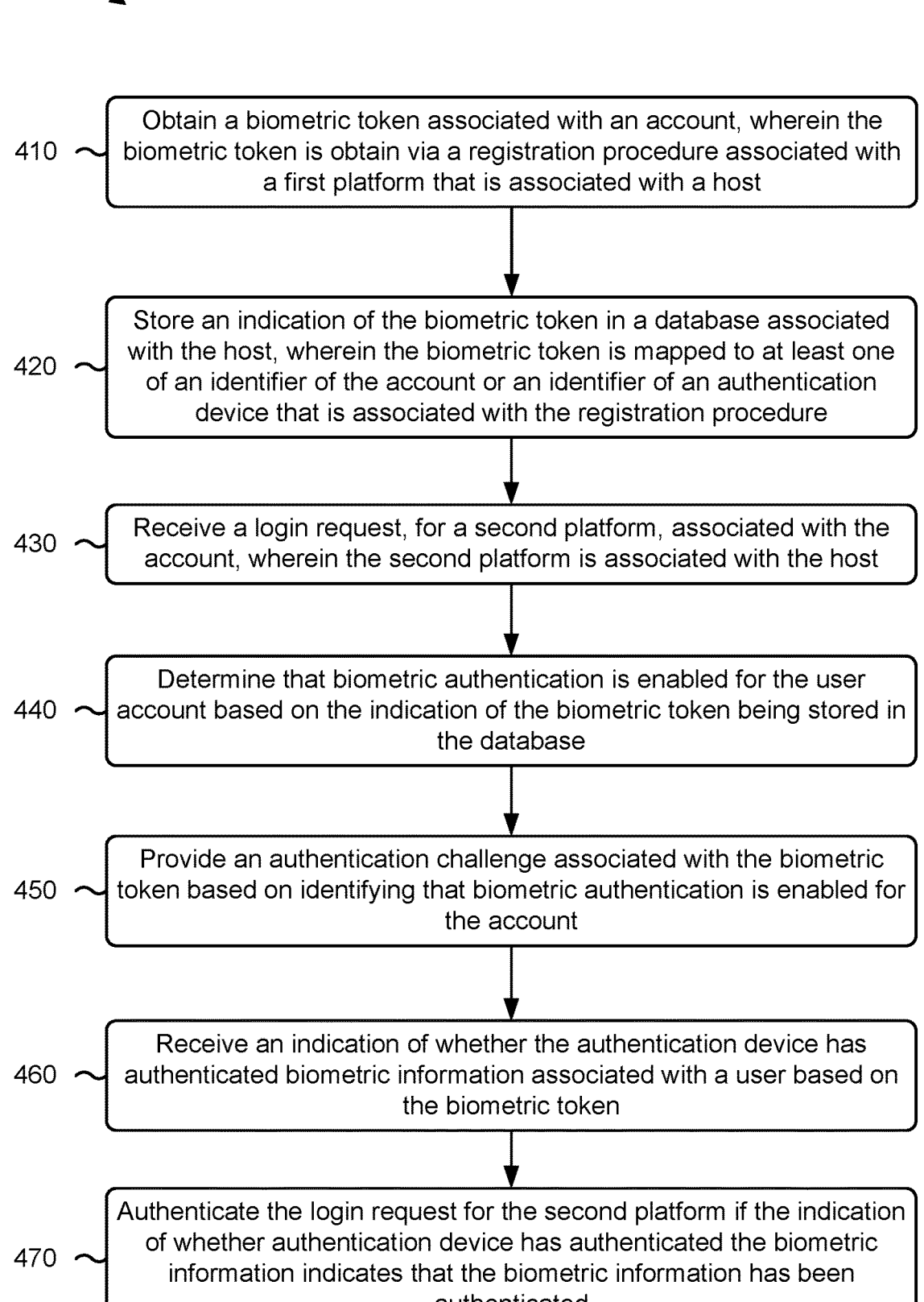

410 — Obtain a biometric token associated with an account, wherein the biometric token is obtain via a registration procedure associated with a first platform that is associated with a host 420 — Store an indication of the biometric token in a database associated with the host, wherein the biometric token is mapped to at least one of an identifier of the account or an identifier of an authentication device that is associated with the registration procedure 430 — Receive a login request, for a second platform, associated with the account, wherein the second platform is associated with the host 440 — Determine that biometric authentication is enabled for the user account based on the indication of the biometric token being stored in the database 450 — Provide an authentication challenge associated with the biometric token based on identifying that biometric authentication is enabled for the account 460 — Receive an indication of whether the authentication device has authenticated biometric information associated with a user based on the biometric token 470 — Authenticate the login request for the second platform if the indication of whether authentication device has authenticated the biometric information indicates that the biometric information has been authenticated

FIG. 4

SHARING A BIOMETRIC TOKEN ACROSS PLATFORMS AND DEVICES FOR AUTHENTICATION

BACKGROUND

Biometric authentication is a security process that relies on the unique biological characteristics of individuals to verify that they are who they say they are. Biometric authentication systems compare measured physical or behavioral traits to stored, confirmed, authentic data in a database. If sample biometric data and stored biometric data match, authentication is confirmed. Typically, biometric authentication is used to manage access to physical and digital resources, such as buildings, rooms, and computing devices. In contrast to biometric identification, which uses biometrics (such as fingerprints or retina scans) to identify a person, biometric authentication is the use of biometrics to verify that people are who they claim to be.

SUMMARY

Some implementations described herein relate to a system for sharing a biometric token across different platforms or different devices for unified account authentication. The system may include one or more memories and one or more processors coupled to the one or more memories. The one or more processors may be configured to perform a registration procedure associated with an account, via a first platform that is associated with a host, wherein the registration procedure enables biometric authentication to be used to authenticate the account for the first platform, and wherein the registration procedure includes obtaining the biometric token associated with the account from an authentication device. The one or more processors may be configured to store an indication of the biometric token in a database associated with the host, wherein the biometric token is mapped to at least one of an identifier of the account or an identifier of the authentication device in the database. The one or more processors may be configured to receive a login request, for a second platform, associated with the account or the authentication device, wherein the second platform is associated with the host. The one or more processors may be configured to provide an authentication challenge associated with the biometric token based on the login request being associated with the account or the authentication device. The one or more processors may be configured to receive a challenge response indicating whether the authentication device has authenticated biometric information associated with a user based on the biometric token. The one or more processors may be configured to authenticate the login request for the second platform if the challenge response indicates that the biometric information is authenticated.

Some implementations described herein relate to a method for sharing a biometric token across different platforms or different devices for unified account authentication. The method may include obtaining, by a server device, the biometric token associated with an account, wherein the biometric token is obtained via a registration procedure associated with a first platform that is associated with a host. The method may include storing, by the server device, an indication of the biometric token in a database associated with the host, wherein the biometric token is mapped to at least one of an identifier of the account or an identifier of an authentication device that is associated with the registration procedure. The method may include receiving, by the server device, a login request, for a second platform, associated with the account, wherein the second platform is associated with the host. The method may include identifying, by the server device, that biometric authentication is enabled for the account based on the indication of the biometric token being stored in the database. The method may include providing, by the server device, an authentication challenge associated with the biometric token based on identifying that biometric authentication is enabled for the account. The method may include receiving, by the server device, an indication of whether the authentication device has authenticated biometric information associated with a user based on the biometric token. The method may include authenticating, by the server device, the login request for the second platform if the indication of whether the authentication device has authenticated the biometric information indicated that the biometric information has been authenticated.

Some implementations described herein relate to a non-transitory computer-readable medium that stores a set of instructions for a device. The set of instructions, when executed by one or more processors of the device, may cause the device to perform a registration procedure, via a first platform that is associated with a host, associated with registering an account with the first platform, wherein the registration procedure enables biometric authentication to be used to authenticate the account, and wherein the registration procedure includes obtaining a biometric token associated with the account from an authentication device. The set of instructions, when executed by one or more processors of the device, may cause the device to store an indication of the biometric token in a centralized database associated with the host. The set of instructions, when executed by one or more processors of the device, may cause the device to receive a login request, for a second platform, associated with the account or the authentication device, wherein the second platform is associated with the host. The set of instructions, when executed by one or more processors of the device, may cause the device to provide an authentication challenge associated with the biometric token based on the login request being associated with the account or the authentication device. The set of instructions, when executed by one or more processors of the device, may cause the device to receive an indication of whether the authentication device has authenticated biometric information associated with a user based on the biometric token. The set of instructions, when executed by one or more processors of the device, may cause the device to authenticate the login request for the second platform if the indication of whether the authentication device has authenticated biometric information indicates that the biometric information has been authenticated.

BRIEF DESCRIPTION OF THE DRAWINGS

FIGS. 1A-1C are diagrams of an example associated with sharing a biometric token across platforms and devices for authentication, in accordance with some embodiments of the present disclosure.

FIG. 4 is a flowchart of an example process associated with sharing a biometric token across platforms and devices for authentication, in accordance with some embodiments of the present disclosure.

DETAILED DESCRIPTION

Figure 1B:
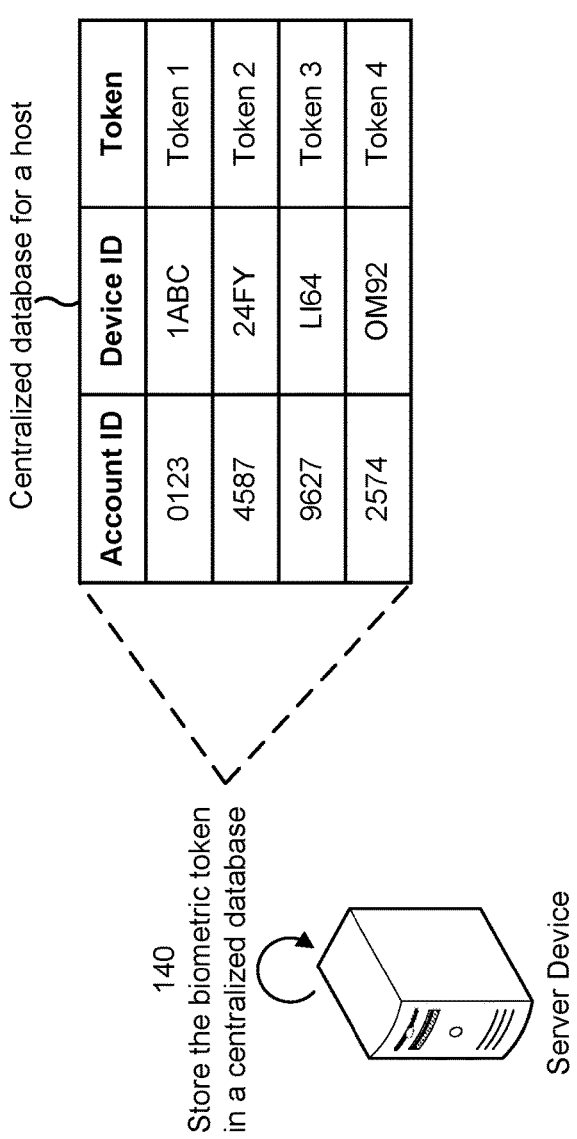

The following detailed description of example implementations refers to the accompanying drawings. The same reference numbers in different drawings may identify the same or similar elements.

Biometric authentication is an identification and/or security process that uses a biologically unique identifier (e.g., fingerprint, voice, iris, retina, or face) of an authorized user (e.g., an account owner or a device owner) to authenticate a user trying to gain access to physical and/or digital resources (e.g., an account or a device). The process may include scanning a biologically unique identifier of the user trying to gain access and comparing the scan to a stored scan of the biologically unique identifier of the authorized user. If there is a sufficient match, then the user may be granted access to the physical and/or digital resources.

For example, to enable biometric authentication for accessing an account associated with a platform, a user may provide credentials (e.g., a username, password, social security number, postal code, name, and/or other credentials) to a server device. The server device may receive an indication that biometric authentication is to be enabled for accessing the account associated with the platform. A user device may obtain biometric data or information associated with the user, such as a fingerprint scan, a face scan, and/or a retinal scan, among other examples. The server device may receive the biometric data and/or the credentials from the user device. The server device may store (e.g., in a database associated with the platform) the biometric data as a biometric credential for each scanned biometric feature and may associate the biometric credential with an account identifier and/or a device identifier (e.g., of the user device). Additionally, or alternatively, the server device may generate a biometric token from the biometric data for each biometric feature. For example, the biometric token may be a unique identifier (e.g., a series of alphanumeric characters) for each biometric feature. The user device and/or the server device may authenticate an access attempt to the account via the platform based on comparing obtained biometric data to the stored biometric data (or the stored biometric token). If there is a sufficient match, then the user may be granted access to the account.

However, if the user wishes to enable biometric authentication for accessing a different platform, then the user may be required to separately perform registration of the biometric data for the different platform. For example, the platform for which the user previously enabled biometric authentication, as described above, may be a mobile platform or native platform executing on and/or installed on the user device (e.g., a mobile platform associated with an application executing on a mobile device). The user may wish to enable biometric authentication for accessing a web platform using the same account (e.g., the same account that is used to access the native platform). However, to enable the biometric authentication for the web-based platform, biometric data may need to be collected from the user and transmitted to a server device, and separate biometric credentials and/or a separate biometric token may be generated. For an access attempt associated with accessing the native application, a first biometric token or credential may be used to authenticate the access attempt. For an access attempt associated with accessing the web-based platform, a second biometric token or credential may be used to authenticate the access attempt.

In other words, even if the biometric authentication is associated with a same account or a same host, separate biometric authentication registrations may be required in order to enable biometric authentication via different platforms, services, or devices. This may consume significant processing resources, memory resources, and/or network resources associated with performing multiple registration procedures and/or with storing multiple biometric tokens or biometric credentials, among other examples, for enabling biometric authentication via multiple platforms, services, and/or devices.

Some techniques and implementations described herein relate to sharing a biometric token across platforms and devices for authentication. For example, a system may perform a registration procedure associated with a user account to enable biometric authentication to be used to authenticate the user account for a first platform or service (e.g., that is associated with a host). The registration procedure may include generating a biometric token based on biometric data or information collected during the registration procedure. The system may store the biometric token in a database (e.g., a centralized database) associated with the host (for example, the biometric token may be mapped to an identifier of an authentication device that is used to collect the biometric data and/or to an identifier of the account in the database).

The system may receive a login request, for a second platform or a second service (for example, that is associated with the host), associated with the user account or the authentication device. For example, the login request may indicate that biometric authentication is to be used and may indicate the identifier of the authentication device and/or an identifier of the user account (e.g., a username). The system may query the database to determine if a biometric token is stored in the database that is associated with (or mapped to) the identifier of the authentication device and/or the identifier of the user account. The system may determine that the biometric token (e.g., generated as part of the registration procedure with the first platform or the first service) is stored in the database and is associated with the authentication device and/or the account.

The system may cause an authentication challenge to be transmitted to the authentication device based on determining that the biometric token is stored in the database. The authentication challenge may cause the authentication device to obtain biometric data from a user. The authentication device and/or the system (e.g., a server device) may determine if there is a sufficient match between the biometric data collected and the biometric token. If the authentication device and/or the system determines that there is a sufficient match, then the system may authenticate the login request for the second platform and/or the second service. For example, the authentication device may transmit an authentication assertion based on determining that there is a sufficient match.

This may provide a unified manner in which to register biometric data for a user across multiple services and/or platforms. For example, by sharing a biometric token that is generated as part of a registration procedure for enabling biometric authentication for a first platform or a first service across multiple platforms or services, separate registration procedures for the multiple platforms or services may not be needed. Rather, a system may utilize the biometric token to enable a user to access the multiple platforms or services after the user performs a single registration procedure. This may conserve processing resources, memory resources, and/or network resources that would have otherwise been used for performing multiple registration procedures and/or with storing multiple biometric tokens or biometric credentials, among other examples, for enabling biometric authentication via multiple platforms, services, and/or devices.

Figure 1C:
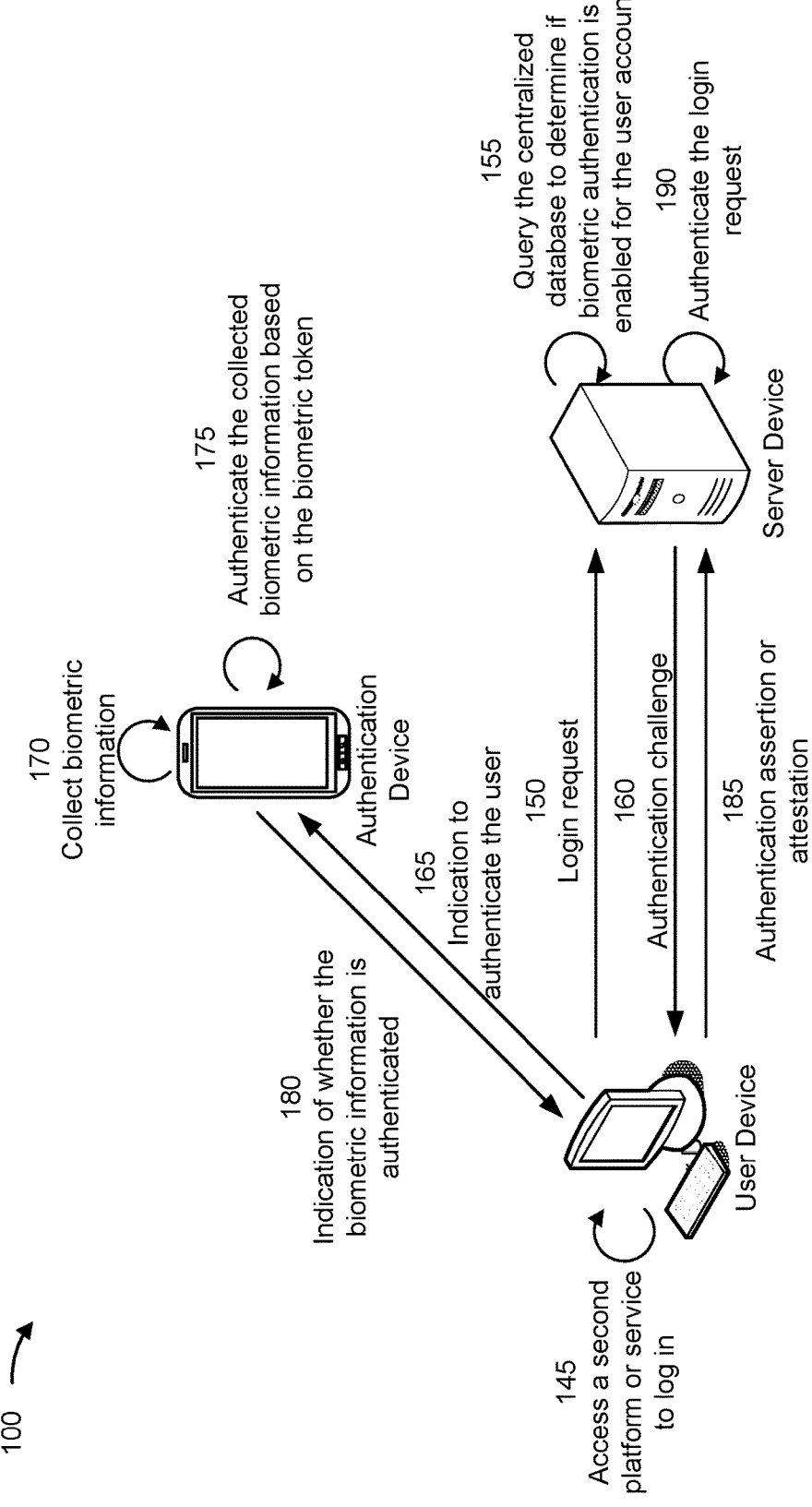

FIGS. 1A-1C are diagrams of an example 100 associated with sharing a biometric token across platforms and devices for authentication. As shown in FIGS. 1A-1C, example 100 includes a user device, an authentication device, a server device, and a database. These devices are described in more detail in connection with FIGS. 2 and 3.

As shown in FIG. 1A, the user device, the authentication device, and/or the server device may perform a registration procedure associated with a user account, via a first platform or service that is associated with a host. As user herein, "host" may refer to a network host, an internet host, or an internet protocol (IP) host, among other examples. For example, the host may be a server, computer, or another device connected to a computer network. The host may work as a server offering information resources, services, and applications to devices or other hosts on the network. In some implementations, the server device may be the host or may be a device associated with the host. As used herein, "platform" may refer to a computing platform or a digital platform. For example, a platform may be an environment in which software is executed (e.g., the hardware and/or software on which a software application may be executed). For example, a platform may include hardware and/or software associated with a device, such as the user device. For example, a platform may be associated with an application executing on the user device (e.g., a mobile application or a native application), an operating system of the user device, a web browser, an application programming interface (API), and/or other program code. In some implementations, a platform may include hardware alone (e.g., an embedded system), a browser (e.g., a web browser), an application, a software framework, a cloud computing service, and/or a virtual machine, among other examples.

In some implementations, the registration procedure may be associated with a web authentication (WebAuthn) procedure. WebAuthn is a web standard published by the World Wide Web Consortium (W3C). Webauthn may define, or otherwise fix, an interface for authenticating users to web-based applications and services using public-key cryptography. The WebAuthn standard defines web-browser APIs for the creation and use of public key infrastructure (PKI)-based authentication credentials, to enable online services to offer password-less authentication and multi-factor authentication. Users may register their device (e.g., the user device and/or the authentication device) to the online service and authenticate using a local mechanism (e.g., the local mechanism may be the authentication device). For example, the WebAuthn standard may define a cryptographic challenge-response authentication mechanism between a relying party (e.g., the server device) and a local authenticator (e.g., the authentication device). As described in more detail below, the registration procedure may enable biometric authentication to be used to authenticate the account for a first platform. The registration procedure may include obtaining (e.g., by the authentication device and/or the server device) a biometric token associated with the account (e.g., via the authentication device).

As shown by reference number 105, the user device may access the first platform or service for registering biometrics associated with authentication of an account. In some implementations, the first platform may be a mobile application or a native application executing on the user device. In some implementations, the first platform may be a web-based platform that is accessed via a web browser executing on the user device. The user device may obtain user input indicating that biometric authentication is to be enabled for accessing the account via the first platform. In some implementations, the user device may obtain an indication or an identifier of the authentication device. For example, the user device may obtain an indication or an identifier of the device that is to be used to collect and/or obtain biometric information for the biometric authentication. For example, if the authentication device is a mobile phone, the user device may obtain an indication of a phone number associated with the mobile phone. In some other implementations, the authentication device may be associated with hardware (e.g., a biometric scanner) that is included in the user device. In such examples, the user device may determine that the authentication device is to be used for collecting and/or obtaining biometric information for the biometric authentication.

As shown by reference number 110, the user device may transmit, and the server device may receive, a registration request associated with registering the user account with the first platform. For example, the registration challenge may be associated with collecting biometric information associated with the account. In some implementations, the registration request may indicate that biometric authentication is to be enabled for the user account. In some implementations, the registration request may indicate an identifier of the authentication device. For example, the user device may initiate a request to register the authentication device on behalf of the user (e.g., to be used for password-less authentication or multi-factor authentication). The registration request may indicate an identifier of the user device, an identifier of the authentication device, and a type of authentication (e.g., biometric authentication) that is to be used, among other examples. In some examples, the registration request may indicate a username or other identifier of the account (e.g., without a password, a personal identification number (PIN), or other credential associated with the account).

The server device may generate a challenge key for registration. The challenge may be a randomly generated string or value. As shown by reference number 115, the server device may transmit, and the user device may receive, an indication of the challenge for registration, an identifier of the server device (e.g., a userid), and/or other information associated with the server device (e.g., relying party information, such as information associated with the server device (e.g., where the server device is the relying party in the WebAuthn procedure)). The user device (e.g., a script or API executing on the user device) may validate the identifier of the server device (e.g., which should match an authoritative domain name). As shown by reference number 120, the user device may provide, to the authentication device, a signal indicating that the authentication is to generate a credential.

As shown by reference number 125, based at least in part on obtaining the signal, the authentication device may collect biometric information or data associated with the account (e.g., associated with a user that is associated with the account). For example, the authentication device may be a platform authenticator (e.g., a biometric scanner built into a device such as the user device or another device). As an example, to obtain the biometric data of the user, the authentication device may include a biometric scanner (e.g., a fingerprint scanner, a camera, and/or a retina scanner) by which the authentication device may scan a biometric feature of the user (e.g., a fingerprint, a retina, or a face) and obtain scanned biometric data corresponding to the scanned biometric feature.

In some implementations, the authentication device may scan, via a biometric scanner, one or more biometric features of the user and/or any other users authorized by the user. The term "biometric feature," as used herein, is intended to broadly include any feature of the user which can be scanned by the biometric scanner, such as a print of any digit (e.g., including any finger or thumb) of the user, a face of the user, a retina or iris of the user, a voice of the user, and/or an ear of the user, among other examples. For example, the authentication device may instruct (e.g., present instructions in text on the display of the authentication device or via voice through a speaker associated with the authentication device) a particular user to place the biometric feature proximate to the biometric scanner (e.g., to place their face in front of a camera or to place a finger on a fingerprint scanner). The authentication device may detect a user interaction with the biometric scanner (e.g., the user's finger pressing on the fingerprint scanner one or more times) until the authentication device determines that the scan of the biometric feature is complete (e.g., the scan satisfies a threshold amount of unique identifier information captured from the scan). The authentication device may provide a notification that the scan is complete. The scan may be in the form of data associated with the biometric feature (e.g., biometric data or biometric information). For example, the scan may be a digital representation of the scanned biometric feature, such as multiple minutiae points (e.g., 17 to 35 minutiae points) that represent the major features of an image of the biometric feature.

In some implementations, the authentication device may store the biometric information or data associated with the user. For example, the authentication device may store (e.g., in a database) the biometric data as a biometric credential for each scanned biometric feature and may associate the biometric credential with the account of the user. Additionally, or alternatively, the authentication device may generate a biometric token from the biometric data for each scanned biometric feature. For example, the biometric token may be a unique identifier (e.g., a series of alphanumeric characters) for each biometric feature. Each biometric token may be unique to a user. Additionally, the biometric token may be smaller (e.g., require less storage space and/or memory) than the biometric data, which conserves memory resources. For example, the authentication device may generate the biometric token by applying a hashing algorithm or another algorithm to the biometric data (e.g., the minutiae points), which may compress the biometric data. In some other examples, the user device or the server device may generate the biometric token based on the biometric data collected by the authentication device.

In some implementations, the authentication device may generate a public-private key pair that is associated with, or mapped to, the biometric data or the biometric token. The authentication device may store the public-private key pair. The public-private key pair may be associated with, or mapped to, the identifier of the server device (e.g., to the relying party identifier). As shown by reference number 130, the authentication device may provide, to the user device, an indication of a credential generated for the biometric authentication of the account. For example, the credential may include a public key, a credential identifier, the biometric token, and/or other attestation information. The user device may combine the information obtained from the authentication device into an object (e.g., an attestationObject). The object may be used to prove an integrity or authenticity of the authentication device. In some implementations, the private key, password, PIN, or other credential may not be provided by the authentication device (e.g., and may be stored by the authentication device to use to authenticate the user at a later time).

As shown by reference number 135, the user device may transmit, and the server device may receive, a registration attestation communication that indicates the object, an identifier of the public key, the biometric token, a value of the challenge indicated in the registration challenge, and/or other information associated with the registration procedure (e.g., as defined, or otherwise fixed, by the WebAuthn standard). In some implementations, the server device may receive or obtain an indication of the biometric information associated with the account, where the biometric token is based on the biometric information. In some implementations, the server device may only obtain the biometric token (e.g., and not the biometric data or biometric information). The server device may validate a signature of the public key, may validate the value of the challenge, and/or may validate the object, among other examples. If the server device validates the registration attestation, then the biometric token and/or the authentication device may be registered to authenticate the user and/or the account.

In some examples, the registration procedure may differ from what is described above. For example, the authentication device and/or the biometric token may be registered with the server device for authenticating the user and/or the account in another manner (e.g., that aligns with, or is defined by, the WebAuthn standard). In other examples, the server device may obtain the biometric token and/or registration information associated with biometric authentication of the user (and/or the account), in a similar manner as described above, using a procedure that does not follow the WebAuthn standard.

In some implementations, the registration information may include an indication of the type of biometric authentication (e.g., fingerprint scan, retina scan, facial recognition, voice recognition, hand and/or vein pattern recognition, iris recognition, and/or hand geometry recognition) associated with the biometric authentication for the account and/or the user. For example, under the user account, a particular type of biometric authentication may be associated with each user, which may be changeable under settings of the user account. The type of biometric authentication may be based on a capability of the authentication device and/or the biometric feature captured by the authentication device (e.g., as described in connection with reference number 125).

As shown in FIG. 1B, the server device may store the biometric token and/or registration information (e.g., a public key, a private key, the attestationObject, an identifier of the authentication device, and/or an identifier of the account) associated with biometric authentication of the user (and/or the account) in a manner that enables the biometric token to be used to authenticate the user account on the different platforms associated with the host without additional registration procedures being associated with the different platforms. For example, as shown by reference number 140, the server device may store the biometric token and/or registration information in a centralized database associated with the host. As used herein, "centralized database" may refer to a database that is located, stored, and maintained in a single location or a distributed database that is accessible by multiple platforms. For example, a database used to store biometric tokens and/or registration information for biometric authentication may be a centralized database, associated with the host, that is accessible by all platforms or services associated with the host (e.g., supported by the host). For example, the host may be enabled to share information stored in the centralized database with multiple (or all) platforms or services associated with the host.

For example, the server device may store an indication of the biometric token in the database. In some examples, the server device may store the actual biometric token (e.g., the series of alphanumeric characters, shown in FIG. 1B as Token 1, Token 2, Token 3, and Token 4) in the database. In other examples, the server device may store an indication that a biometric token exists for biometric authentication associated with the account and/or the authentication device (e.g., and may not store the actual biometric token). In such examples, the biometric token may be stored by the authentication device. For example, the server device may store an indication in the database (e.g., such as yes or no, or 1 or 0) indicating whether biometric authentication has been associated with the authentication device and/or the account.

Rather than storing the indication of the biometric token (e.g., the actual biometric token or the indication that the biometric token exists) in a manner that ties the biometric token only to the first platform (e.g., that was used to register the biometric authentication as described in connection with FIG. 1A), the server device may store the indication of the biometric token and/or the registration information in a centralized and unified manner such that the host can determine that the authentication device and/or the account has been registered for biometric authentication across multiple platforms and/or services supported by the host. In other words, the server device may store the indication of the biometric token in a persistent and shareable manner such that the server device can determine that the authentication device is registered to perform biometric authentication associated with the user and/or the account across multiple platforms and/or services without the user performing a registration procedure with each platform and/or with each service. This conserves time, memory resources, processing resources, computing resources, and/or network resources that would have otherwise been used to perform a registration procedure to enable biometric authentication with each platform and/or with each service.

As shown in FIG. 1B, the biometric token (or the indication of the biometric token) may be mapped to at least one of an identifier of the account (e.g., the account identifier (ID)) or an identifier of the authentication device (e.g., the device ID) in the database. For example, the server device may store the indication of the biometric token in an entry of the centralized database that is mapped to, or associated with, the identifier of the account and/or the identifier of the authentication device to enable multiple platforms associated with the host to access the biometric token to be used to authenticate the user account. For example, storing the indication of the biometric token in this manner may enable the server device to identify that biometric authentication is registered for the account and/or the authentication device if the identifier of the account and/or the identifier of the authentication device is provided in a login request from another platform or service that is associated with the host, as described in more detail elsewhere herein.

As shown in FIG. 1C, and by reference number 145, a user device (e.g., the same user device as described in connection with FIG. 1A or a second (e.g., different) user device) may access a second platform or service for logging in to the second platform or service. In some implementations, the second platform may be a mobile application or a native application executing on the user device. In some other implementations the second platform may be a web-based platform that is accessed via a web browser executing on the user device. The second platform may be a different platform than the first platform (e.g., that was used to register the biometric authentication, as described in connection with FIG. 1A). The first platform and the second platform may be associated with the same host.

The user device may obtain an indication of a login request for the second platform. The login request may indicate that the user wishes to log in to the second platform using biometric authentication. In some implementations, the login request may include an indication of the identifier of the account. For example, the user device may obtain an indication of a username or email address associated with the account. Additionally, or alternatively, the login request may include an indication of the identifier of the authentication device. For example, the login request may include an indication of the authentication device that is to be used to perform the biometric authentication for logging into the second platform. As an example, if the authentication device is a mobile phone, then the login request may include an indication of a phone number associated with the mobile phone. As another example, if the authentication device is a component or hardware included in the user device, then the login request may include an indication that the user device (e.g., the authentication device included in the user device) is to be used to perform the biometric authentication for logging into the second platform.

As shown by reference number 150, the user device may transmit, and the server device may receive, a login request, for the second platform, associated with the account or the authentication device. The login request may include an indication of the identifier of the account. Additionally, or alternatively, the login request may include an indication of the identifier of the authentication device. The server device may identify that biometric authentication is enabled for the account and/or for the authentication device based on the indication of the biometric token being stored in the database.

For example, as shown by reference number 155, the server device may query the database (e.g. the centralized database), based on receiving the login request, using the identifier of the account and/or the identifier of the authentication device. Querying the database may enable the server device to identify an entry in the database that includes an indication of the biometric token. As another example, querying the database may enable the server device to determine that biometric authentication has been registered for the account and/or for the authentication device. For example, in some cases, the login request may be associated with a second account that is different than a first account used to register the biometric authentication (e.g., the first account being the account described above in connection with FIG. 1A). However, the first account and the second account may be associated with the same user. Therefore, the user may input an indication of the authentication device (e.g., that was used to register the biometric authentication as described above in connection with FIG. 1A) to indicate that the user is to be authenticated using biometric authentication performed by the authentication device.

As another example, the login request may be associated with a second authentication device that is different than a first authentication device used to register the biometric authentication (e.g., the first authentication device being the authentication device described above in connection with FIG. 1A). However, the first authentication device and the second authentication device may be associated with the same user. Therefore, the user may input an indication of the account (e.g., that was used to register the biometric authentication as described above in connection with FIG. 1A) to indicate that the user is to be authenticated using biometric information (e.g., the biometric token) that was generated as part of the registration procedure. Therefore, storing the indication of the biometric token as being associated with the account and the authentication device may provide flexibility for a user to login using biometric authentication on different accounts and/or different authentication devices associated with the user (e.g., using the same biometric token that is generated in a single registration procedure). Additionally, this may conserve processing resources, memory resources, and/or network resources that would have otherwise been used for performing multiple registration procedures and/or with storing multiple biometric tokens or biometric credentials, among other examples, for enabling biometric authentication via multiple platforms, multiple services, multiple accounts, and/or multiple authentication devices.

The server device may determine, based on querying the database, that biometric authentication is enabled for the account and/or for the authentication device (e.g., that are indicated in the login request) based on the indication of the biometric token being stored in the database. For example, the server device may identify the entry (or a row) in the database that is associated with the identifier of the account and/or with the identifier of the authentication device. The server device may identify that the entry (or the row) includes an indication of the biometric token (e.g., includes the actual biometric token or includes an indication that a biometric token has been registered). Based on determining that the indication of the biometric token is stored in the database, the server device may determine that biometric authentication should be used to authenticate the login request (e.g., for the login request to the second platform). If the server device determines that an indication of a biometric token associated with the authentication device and/or the account is not stored in the database, then the server device may proceed with a registration procedure in a manner similar to that described above in connection with FIG. 1A.

In some implementations, the login request may be provided to a first server device (e.g., a platform server associated with the second platform). The first server device may query a second server device (e.g., a host server device associated with the host) requesting information associated with any biometric authentication registration information that is stored by the second server device for the authentication device and/or the account. The second server device may query the database (e.g., in a similar manner as described above). The second server device may provide, to the first server device, an indication of whether biometric authentication registration information (e.g., the indication of the biometric token) is stored in the database. If the second server device indicates that the biometric authentication registration information is stored in the database, then the first server device may proceed with authenticating the user in accordance with the biometric authentication registration information (e.g., as if the user had registered the biometric authentication registration information with the first server device and/or with the second platform). If the second server device indicates that the biometric authentication registration information is not stored in the database, then the first server device may proceed with a registration procedure in a manner similar to that described above in connection with FIG. 1A.

Based on determining that biometric authentication is registered for the authentication device and/or the account, the server device may generate an authentication challenge associated with the login request. For example, the server device may generate a unique challenge (e.g., a unique series of alphanumeric characters). In some implementations, the authentication challenge may be associated with an indication to perform biometric authentication and/or an identifier of the authentication device (e.g., that is to perform the biometric authentication). As shown by reference number 160, the server device may provide (e.g., to the user device) an authentication challenge associated with the biometric token based on identifying that biometric authentication is enabled for the user account. For example, the authentication challenge may be associated with, or may indicate, the biometric token based on the login request being associated with the account and/or the authentication device. For example, providing the authentication challenge may be based on the server device identifying that biometric authentication is enabled for the user account. In other words, the server device may provide an authentication challenge (e.g., rather than a registration challenge) in response to the login request, based on the biometric token and/or the registration information being shared by the server device across different platforms (e.g., with the first platform and the second platform).

As shown by reference number 165, based on obtaining the authentication challenge, the user device may provide, to the authentication device, an indication to authenticate the user via biometric authentication. For example, the user device may provide an indication of the authentication challenge to the authentication device. In some implementations, the user device may provide, to the authentication device, an indication of the biometric token. In some implementations, the user device may provide, to the authentication device, an indication of the identifier of the server device (e.g., an identifier of a relying party in the authentication procedure). The authentication device may determine the biometric token to be used to authenticate the user based on the identifier of the server device. For example, the authentication device may determine that the registration procedure associated with the identifier of the server device (e.g., with the identifier of the relying party) was previously performed (e.g., as described in connection with FIG. 1A). The authentication device may determine the biometric token to be used to confirm the authentication challenge based on the biometric token being associated with the identifier of the server device. In some implementations, the indication from the user device may indicate a credential identifier (e.g., that was generated as part of the registration procedure and indicated in the authentication challenge). The authentication device may determine the biometric token to be used to confirm the authentication challenge based on the biometric token being associated with the credential identifier.

As shown by reference number 170, based at least in part on obtaining the indication to authenticate the user from the user device, the authentication device may collect biometric information or data (e.g., in a similar, or the same, manner as described in more detail elsewhere herein, such as in connection with reference number 125). For example, the server device providing the authentication challenge to the user device may prompt the authentication device to request biometric information from a user to be used to authenticate the login request. As shown by reference number 175, the authentication device may authenticate the collected biometric information or data based on the biometric token. For example, the authentication device may compare scanned biometric information or data with stored biometric information or data corresponding to the biometric token (e.g., that is stored on a memory of the authentication device and/or on a remote server or database). If the authentication device determines that the scanned biometric information or data sufficiently matches the stored biometric information data (e.g., if a quantity of minutiae points between the scanned biometric data and the stored biometric data that are the same satisfy a threshold), then the authentication device may determine that the user is authenticated.

Based on authenticating the user via biometric authentication, the authentication device may determine that the authentication challenge is successfully authenticated. For example, the authentication device may generate a signed authentication assertion in response to the authentication challenge. As shown by reference number 180, the authentication device may provide, to the user device, an indication of whether the authentication device has authenticated biometric information associated with the user based on the biometric token. For example, the authentication device may provide a signed authentication assertion that indicates that the authentication device has authenticated the user. The signed authentication assertion may include an indication of the authentication challenge and an indication of the identifier associated with the server device. In some implementations, the signed authentication assertion may include authenticator data that is generated, by the authentication device, using a private key (e.g., the private key generated during the registration procedure described above in connection with FIG. 1A). For example, based on authenticating the user via biometric authentication, the authentication device may generate authenticator data using the private key that is associated with the biometric token.

As shown by reference number 185, the user device may provide (e.g., may forward), to the server device, the signed authentication assertion or attestation that is provided by the authentication device. For example, the server device may receive or obtain a challenge response (e.g., the signed authentication assertion) indicating whether the authentication device has authenticated biometric information associated with the user based on the biometric token. As shown by reference number 190, the server device may authenticate the login request based on the authentication assertion received from the user device. For example, the server device may compare an indication of the authentication challenge included in the authentication assertion to the authentication challenge that was provided to the user device (e.g., as described above in connection with reference number 185) to ensure that the authentication challenge included in the authentication assertion matches the authentication challenge that was provided to the user device.

Additionally, the server device may authenticate the authenticator data using the private key that is associated with the biometric token. For example, the server device may decrypt the authenticator data using the private key to determine whether the authenticator data is authentic. The server device may authenticate the login request for the second platform based on authenticating the authentication assertion provided by the user device. In other words, the server device may authenticate the login request for the second platform if the challenge response (e.g., the authentication assertion) indicates that the biometric information is authenticated. If the server device successfully authenticates the authentication assertion, then the server device may grant the login request and enable the user device to access the second platform. If the server device does not successfully authenticate the authentication assertion, then the server device may deny the login request and may not enable the user device to access the second platform.

In this way, a unified manner to register biometric data for a user across multiple services and/or platforms may be provided. For example, by sharing a biometric token that is generated as part of a registration procedure for enabling biometric authentication for a first platform or a first service across multiple platforms or services, separate registration procedures for the multiple platforms or services may not be needed. Rather, the server device and/or the authentication device may utilize the biometric token to enable a user to access the multiple platforms or services after the user performs a single registration procedure. This may conserve processing resources, memory resources, and/or network resources that would have otherwise been used for performing multiple registration procedures and/or with storing multiple biometric tokens or biometric credentials, among other examples, for enabling biometric authentication via multiple platforms, services, and/or devices.

As indicated above, FIGS. 1A-1C are provided as an example. Other examples may differ from what is described with regard to FIGS. 1A-1C.

Figure 2:
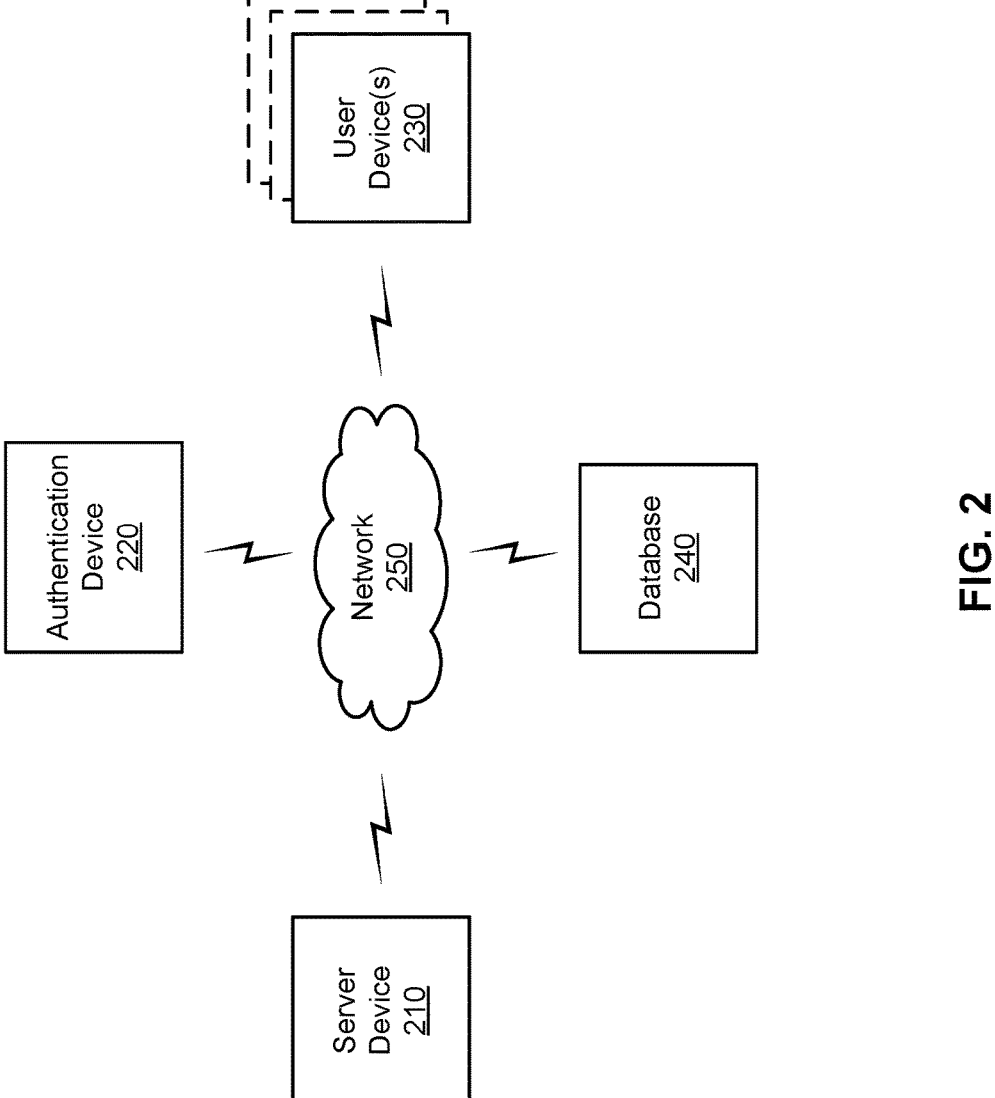
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a server device 210, an authentication device 220, one or more user devices 230, a database 240, and a network 250. Devices of environment 200 may interconnect via wired connections, wireless connections, or a combination of wired and wireless connections.

The server device 210 may include one or more devices capable of receiving, generating, storing, processing, providing, and/or routing information associated with sharing a biometric token across platforms and devices for authentication, as described elsewhere herein. The server device 210 may include a communication device and/or a computing device. For example, the server device 210 may include a server, such as an application server, a client server, a web server, a database server, a host server, a proxy server, a virtual server (e.g., executing on computing hardware), or a server in a cloud computing system. In some implementations, the server device 210 may include computing hardware used in a cloud computing environment.

The authentication device 220 may include one or more devices capable of receiving, generating, storing, processing, and/or providing information associated with sharing a biometric token across platforms and devices for authentication, as described elsewhere herein. The authentication device 220 may include a communication device and/or a computing device. For example, the authentication device 220 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. In some implementations, the authentication device 220 may include a biometric scanner, such as a fingerprint reader, a camera, and/or a retina scanner, among other examples. In some implementations, the authentication device 220 may include hardware, software, or a combination of hardware and software that is included in a user device 230 (e.g., the authentication device 220 may include a biometric scanner that is included in a user device 230). In some implementations, the authentication device 220 may include a storage component, such as a solid state drive (SSD), a universal serial bus (USB) stick, a secure digital (SD) card, a cartridge, a magnetic tape, and/or another type of non-transitory computer-readable medium, along with a corresponding drive.

A user device 230 may include one or more devices capable of receiving, generating, storing, processing, and/or providing information associated with sharing a biometric token across platforms and devices for authentication, as described elsewhere herein. The user device 230 may include a communication device and/or a computing device. For example, the user device 230 may include a wireless communication device, a mobile phone, a user equipment, a laptop computer, a tablet computer, a desktop computer, a gaming console, a wearable communication device (e.g., a smart wristwatch, a pair of smart eyeglasses, a head mounted display, or a virtual reality headset), or a similar type of device.

The database 240 may include one or more devices capable of receiving, generating, storing, processing, and/or providing information associated with sharing a biometric token across platforms and devices for authentication, as described elsewhere herein. The database 240 may include a communication device and/or a computing device. For example, the database 240 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the database 240 may store biometric information, such as biometric tokens, associated with a user account or a device (such as the authentication device 220 and/or the user device 230), as described elsewhere herein.

The network 250 may include one or more wired and/or wireless networks. For example, the network 250 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
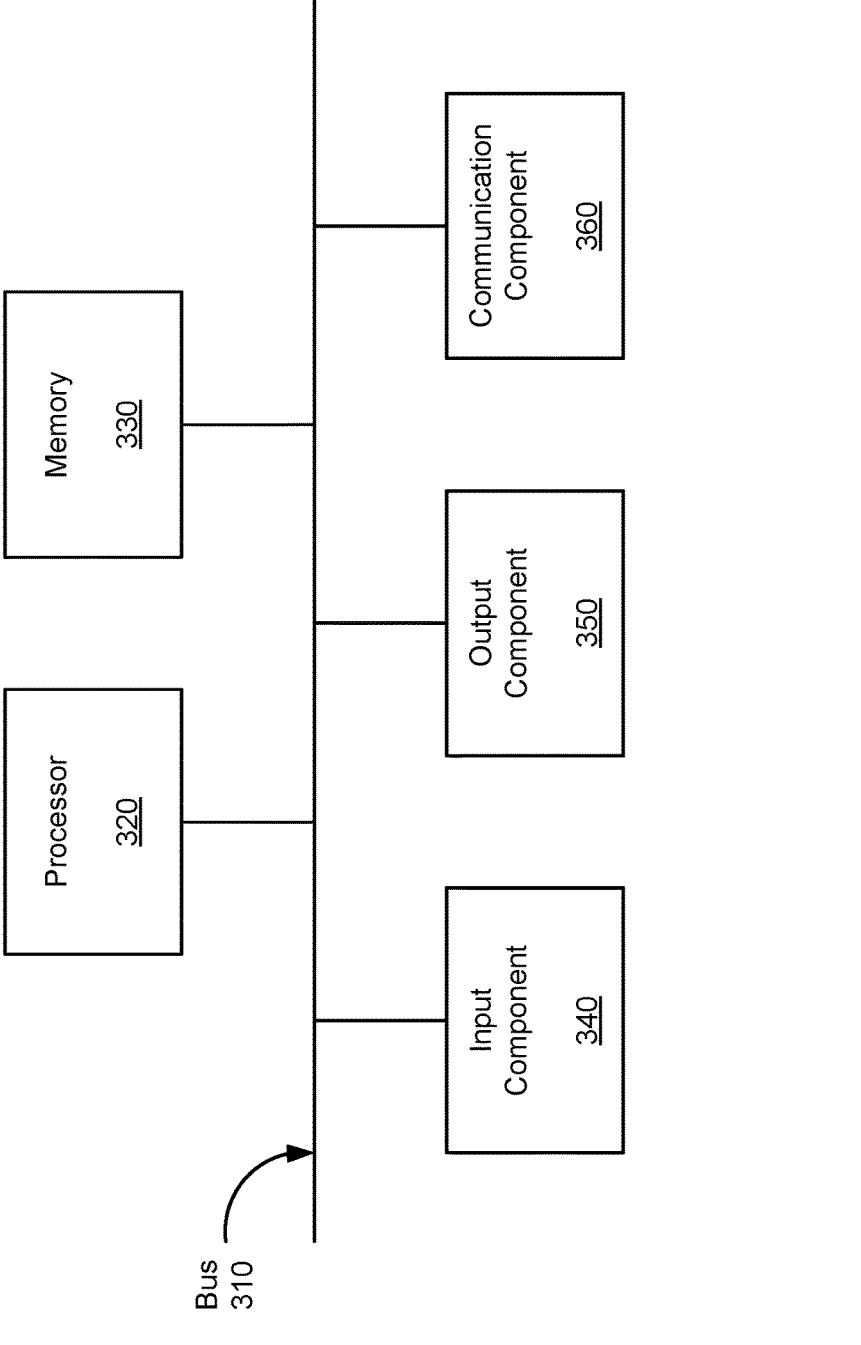
FIG. 3 is a diagram of example components of a device associated with sharing a biometric token across platforms and devices for authentication, in accordance with some embodiments of the present disclosure.

FIG. 3 is a diagram of example components of a device 300 associated with sharing a biometric token across platforms and devices for authentication. Device 300 may correspond to the server device 210, the authentication device 220, the user device 230, and/or the database 240. In some implementations, the server device 210, the authentication device 220, the user device 230, and/or the database 240 may include one or more devices 300 and/or one or more components of device 300. As shown in FIG. 3, device 300 may include a bus 310, a processor 320, a memory 330, an input component 340, an output component 350, and a communication component 360.

Bus 310 may include one or more components that enable wired and/or wireless communication among the components of device 300. Bus 310 may couple together two or more components of FIG. 3, such as via operative coupling, communicative coupling, electronic coupling, and/or electric coupling. Processor 320 may include a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 may include one or more processors capable of being programmed to perform one or more operations or processes described elsewhere herein.

Memory 330 may include volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 may include one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna. In some implementations, input component 340 may include a biometric scanner or a biometric sensor, such as a fingerprint reader, a camera, and/or a retina scanner, among other examples.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with sharing a biometric token across platforms and devices for authentication. In some implementations, one or more process blocks of FIG. 4 may be performed by the server device 210. In some implementations, one or more process blocks of FIG. 4 may be performed by another device or a group of devices separate from or including the server device 210, such as the authentication device 220, a user device 230, and/or the database 240. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining the biometric token associated with an account, wherein the biometric token is obtained via a registration procedure associated with a first platform that is associated with a host (block 410). For example, the server device 210 (e.g., using processor 320 and/or memory 330) may obtain the biometric token associated with an account, wherein the biometric token is obtained via a registration procedure associated with a first platform that is associated with a host, as described above in connection with reference number 135 of FIG. 1A. As an example, the server device 210 may perform the registration procedure (e.g., with a user device 230 and/or the authentication device 220) to register biometric authentication information for a user via the first platform. The biometric authentication information may include the biometric token and a public-private key pair.

As further shown in FIG. 4, process 400 may include storing an indication of the biometric token in a database associated with the host, wherein the biometric token is mapped to at least one of an identifier of the account or an identifier of an authentication device that is associated with the registration procedure (block 420). For example, the server device 210 (e.g., using processor 320 and/or memory 330) may store an indication of the biometric token in a database associated with the host, wherein the biometric token is mapped to at least one of an identifier of the account or an identifier of an authentication device that is associated with the registration procedure, as described above in connection with reference number 140 of FIG. 1B. As an example, the server device 210 may store an indication of the biometric token in a centralized database (e.g., in an entry that is mapped to the identifier of the account and/or the identifier of the authentication device 220) to enable the server device to determine that the biometric authentication information has been obtained by the server device.

As further shown in FIG. 4, process 400 may include receiving a login request, for a second platform, associated with the account, wherein the second platform is associated with the host (block 430). For example, the server device 210 (e.g., using processor 320, memory 330, input component 340, and/or communication component 360) may receive a login request, for a second platform, associated with the account, wherein the second platform is associated with the host, as described above in connection with reference number 150 of FIG. 1C. As an example, the user associated with the registration procedure may request to log in to the second platform using biometric authentication.

As further shown in FIG. 4, process 400 may include identifying that biometric authentication is enabled for the account based on the indication of the biometric token being stored in the database (block 440). For example, the server device 210 (e.g., using processor 320 and/or memory 330) may identify that biometric authentication is enabled for the account based on the indication of the biometric token being stored in the database, as described above in connection with reference number 155 of FIG. 1C. As an example, the server device 210 may query the database to determine that the indication of the biometric token (e.g., that was generated as part of the registration procedure that was performed via the first platform) is stored in the database.

As further shown in FIG. 4, process 400 may include providing an authentication challenge associated with the biometric token based on identifying that biometric authentication is enabled for the account (block 450). For example, the server device 210 (e.g., using processor 320 and/or memory 330) may provide an authentication challenge associated with the biometric token based on identifying that biometric authentication is enabled for the account, as described above in connection with reference number 160 of FIG. 1C. As an example, based on the server device 210 determining that the biometric authentication information associated with the user has already been obtained, the server device may proceed with authenticating the user using the biometric authentication information (e.g., rather than performing another registration procedure via the second platform).

As further shown in FIG. 4, process 400 may include receiving an indication of whether the authentication device has authenticated biometric information associated with a user based on the biometric token (block 460). For example, the server device 210 (e.g., using processor 320, memory 330, input component 340, and/or communication component 360) may receive an indication of whether the authentication device has authenticated biometric information associated with a user based on the biometric token, as described above in connection with reference number 185 of FIG. 1C. As an example, the server device 210 may obtain, from the user device 230, an authentication attestation in response to the authentication challenge that indicates that the authentication device 220 has successfully authenticated the user using biometric authentication (e.g., using the biometric token that was generated as part of the registration procedure with the first platform).

As further shown in FIG. 4, process 400 may include authenticating the login request for the second platform if the indication of whether the authentication device has authenticated the biometric information indicated that the biometric information has been authenticated (block 470). For example, the server device 210 (e.g., using processor 320 and/or memory 330) may authenticate the login request for the second platform if the indication of whether the authentication device has authenticated the biometric information indicated that the biometric information has been authenticated, as described above in connection with reference number 190 of FIG. 1C. As an example, the server device 210 may authenticate the authentication attestation using the public-private key pair and/or the biometric token that was generated as part of the registration procedure with the first platform. The server device 210 may grant or deny the login request for the second platform based on whether the authentication attestation is authenticated by the server device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for sharing a biometric token across different computing platforms or different devices for unified account authentication, the system comprising:

one or more memories; and one or more processors, coupled to the one or more memories, configured to:

perform a registration procedure associated with an account, via a first computing platform that is associated with a host, wherein the registration procedure enables biometric authentication to be used to authenticate the account for the first computing platform and a second computing platform, and wherein the registration procedure includes obtaining the biometric token from an authentication device, wherein the registration procedure enables the biometric token to be used to authenticate the account on the different computing platforms, including the second computing platform, associated with the host, without performance of additional registration procedures associated with the different computing platforms;

store an indication that the biometric token has been registered in an entry of a database, the database associated with the host, wherein the entry of the database is mapped to at least one of an identifier of the account or an identifier of the authentication device;

receive a login request, for the second computing platform, associated with the account or the authentication device, wherein the second computing platform is associated with the host;

provide an authentication challenge associated with the biometric token based on the login request being associated with the account or the authentication device;

receive a challenge response indicating whether the authentication device has authenticated biometric information associated with a user based on the biometric token; and authenticate the login request for the second computing platform if the challenge response indicates that the biometric information associated with the user is authenticated.

2. The system of claim 1, wherein the one or more processors are further configured to:

query the database, based on receiving the login request, using at least one of the identifier of the account or the identifier of the authentication device based on receiving the login request; and determine, based on querying the database, that the biometric authentication is enabled for the account based on the indication that the biometric token has been registered being stored in the entry of the database, wherein providing the authentication challenge is based on identifying that the biometric authentication is enabled for the account.

3. The system of claim 1, wherein the one or more processors, to perform the registration procedure, are configured to:

receive a registration request associated with registering the account with the first computing platform, wherein the registration request indicates that the biometric authentication is to be enabled for the account, and wherein the registration request indicates the identifier of the authentication device;

provide a registration challenge associated with collecting biometric information associated with the account; and receive an indication of the biometric information associated with the account, wherein the biometric token is based on the biometric information associated with the account.

4. The system of claim 1, wherein the biometric token is generated by applying a hashing algorithm to minutiae points of the biometric information associated with the user.

5. The system of claim 1, wherein providing the authentication challenge prompts the authentication device to request, from the user, the biometric information associated with the user to be used to authenticate the login request.

6. The system of claim 1, wherein the first computing platform is accessed via a first user device and the second computing platform is accessed via a second user device.

7. The system of claim 1, wherein the first computing platform is a mobile platform associated with an application executing on a mobile device, and wherein the second computing platform is a web platform associated with a web browser.

8. A method for sharing a biometric token across different computing platforms or different devices for unified account authentication, comprising:

obtaining, by a server device, the biometric token, wherein the biometric token is obtained via a registration procedure associated with a first computing platform that is associated with a host, wherein the registration procedure enables biometric authentication to be used to authenticate the account for the first computing platform and a second computing platform, wherein the registration procedure enables the biometric token to be used to authenticate the account on the different computing platforms, including the second computing platform, associated with the host, without performing additional registration procedures associated with the different computing platforms;

storing, by the server device, an indication that the biometric token has been registered in an entry of a database, the database associated with the host, wherein the entry of the database is mapped to at least one of an identifier of the account or an identifier of an authentication device that is associated with the registration procedure;

receiving, by the server device, a login request, for the second computing platform, associated with the account, wherein the second computing platform is associated with the host;

identifying, by the server device, that the biometric authentication is enabled for the account based on the indication that the biometric token has been registered being stored in the entry of the database;

providing, by the server device, an authentication challenge associated with the biometric token based on identifying that the biometric authentication is enabled for the account;

receiving, by the server device, an indication of whether the authentication device has authenticated biometric information associated with a user based on the biometric token; and authenticating, by the server device, the login request for the second computing platform if the indication of whether the authentication device has authenticated the biometric information associated with the user indicated that the biometric information associated with the user has been authenticated.

9. The method of claim 8, wherein identifying that the biometric authentication is enabled for the account comprises:

querying the database using at least one of the identifier of the account or the identifier of the authentication device, based on receiving the login request, to identify the entry of the database that includes the indication that the biometric token has been registered.

10. The method of claim 8, further comprising:

receiving a registration request associated with registering the account with the first computing platform, wherein the registration request indicates that the biometric authentication is to be enabled for the account, and wherein the registration request indicates the identifier of the authentication device;

providing a registration challenge associated with collecting biometric information associated with the account; and receiving the indication that the biometric token has been registered.

11. The method of claim 8, wherein the biometric token is generated by applying a hashing algorithm to minutiae points of the biometric information associated with the user.

12. The method of claim 8, wherein the registration procedure is associated with a web authentication procedure.

13. The method of claim 8, wherein the first computing platform is a native platform associated with a user device, and wherein the second computing platform is a web platform associated with a web browser.

14. The method of claim 8, wherein the database is a centralized database, associated with the host, that is accessible by all platforms associated with the host.

15. A non-transitory computer-readable medium storing a set of instructions, the set of instructions comprising:

one or more instructions that, when executed by one or more processors of a device, cause the device to:

perform a registration procedure, via a first computing platform that is associated with a host, associated with registering an account with the first computing platform, wherein the registration procedure enables biometric authentication to be used to authenticate the account for the first computing platform and a second computing platform, and wherein the registration procedure includes obtaining a biometric token associated with the account from an authentication device, wherein the registration procedure enables the biometric token to be used to authenticate the account on different computing platforms, including the second computing platform, associated with the host, without performance of additional registration procedures associated with the different computing platforms;

store an indication that the biometric token has been registered in an entry of a centralized database, the centralized database associated with the host, wherein the entry of the centralized database is associated with at least one of an identifier of the account or an identifier of the authentication device;

receive a login request, for the second computing platform, associated with the account or the authentication device, wherein the second computing platform is associated with the host;

provide an authentication challenge associated with the biometric token based on the login request being associated with the account or the authentication device;

receive an indication of whether the authentication device has authenticated biometric information associated with a user based on the biometric token; and authenticate the login request for the second computing platform if the indication of whether the authentication device has authenticated the biometric information associated with the user indicates that the biometric information associated with the user has been authenticated.

16. The non-transitory computer-readable medium of claim 15, wherein the one or more instructions further cause the device to:

query the centralized database using at least one of the identifier of the account or the identifier of the authentication device based on receiving the login request; and determine that the biometric authentication is enabled for the account based on the indication that the biometric token has been registered being stored in the entry of the centralized database, wherein providing the authentication challenge is based on identifying that the biometric authentication is enabled for the account.

17. The non-transitory computer-readable medium of claim 15, wherein the one or more instructions, that cause the device to perform the registration procedure, cause the device to:

receive a registration request associated with registering the account with the first computing platform, wherein the registration request indicates that the biometric authentication is to be enabled for the account, and wherein the registration request indicates the identifier of the authentication device;

provide a registration challenge associated with collecting biometric information associated with the account; and receive an indication of the biometric information associated with the account, wherein the biometric token is based on the biometric information associated with the account.

18. The non-transitory computer-readable medium of claim 15, wherein the biometric token is generated by applying a hashing algorithm to minutiae points of the biometric information associated with the user.

19. The non-transitory computer-readable medium of claim 15, wherein providing the authentication challenge prompts the authentication device to request, from the user, the biometric information associated with the user to be used to authenticate the login request.

20. The non-transitory computer-readable medium of claim 15, wherein the entry of the centralized database is mapped to at least one of the identifier of the account or the identifier of the authentication device to enable multiple platforms associated with the host to access the biometric token to be used to authenticate the account.

\* \* \* \* \*